United States Patent
Solanki et al.

(10) Patent No.: US 11,687,082 B2
(45) Date of Patent: Jun. 27, 2023

(54) TRAFFIC MANAGEMENT SYSTEM AND METHOD

(71) Applicant: TE Connectivity Services GmbH, Schaffhausen (CH)

(72) Inventors: Swapnilsinh Solanki, Harrisburg, PA (US); Anthony L. Swann, Lancaster, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 132 days.

(21) Appl. No.: 17/030,508

(22) Filed: Sep. 24, 2020

(65) Prior Publication Data

US 2022/0091612 A1    Mar. 24, 2022

(51) Int. Cl.
*G05D 1/02*        (2020.01)

(52) U.S. Cl.
CPC ......... *G05D 1/0214* (2013.01); *G05D 1/0257* (2013.01); *G05D 2201/0216* (2013.01)

(58) Field of Classification Search
None
See application file for complete search history.

(56) References Cited

U.S. PATENT DOCUMENTS

| 2007/0222639 | A1* | 9/2007 | Giles | G08G 1/07 |
| | | | | 701/119 |
| 2007/0274158 | A1* | 11/2007 | Agam | G01P 13/04 |
| | | | | 367/96 |
| 2018/0096595 | A1* | 4/2018 | Janzen | G08G 1/04 |
| 2019/0033882 | A1* | 1/2019 | Collett | G05D 1/0088 |

FOREIGN PATENT DOCUMENTS

| JP | H0713008 U | * | 3/1995 |
| JP | 2010257184 A | * | 11/2010 |

OTHER PUBLICATIONS

Machine translation of JP 2010257184 A (Year: 2010).*
Machine translation of JPH0713008U (Year: 1995).*

* cited by examiner

*Primary Examiner* — Anne Marie Antonucci
*Assistant Examiner* — Kyle S Park

(57) ABSTRACT

A traffic management system for controlling an AGV includes a sensor arranged proximate to an intersection between first and second passages in a logistics facility. The sensor transmits sensing beams into the second passage to detect presence of a vehicle in the second passage. The sensor transmits sensor signals based on the presence of the vehicle in the second passage. The traffic management system includes a traffic controller receiving the sensor signals and communicating with the AGV causing the AGV to stop at a stopping location in the first passage and restrict movement of the AGV into the second passage when the object is detected.

22 Claims, 3 Drawing Sheets

US 11,687,082 B2

TRAFFIC MANAGEMENT SYSTEM AND METHOD

BACKGROUND OF THE INVENTION

The subject matter herein relates generally to traffic management systems and methods.

Automatic guided vehicles (AGV) are used in logistics facilities to transport products or packages between various stations or areas of the facility. The AGVs are programmable and move autonomously through the facility, such as between various aisles or passages. The AGVs generally use onboard sensors to look for obstacles during navigation. In order to navigate from one location to another location, AGVs do path planning. However, the path planning does not account for dynamic obstacles which might block the planned travel path of the AGV during navigation. For example, other vehicles or people may also be present within the logistics facility. While navigating on a path, the AGV safely stops if it comes across a dynamic obstacle and then tries to find alternative path to reach to its destination. Usually, in plants or warehouses, there is a constant movement of fork trucks and other manned vehicles. If the AGV moves too close to such manned vehicles in tight passages, it can create a deadlock situation where there is no way out for the fork truck, and AGV cannot find an alternate path to reach to its destination.

A need remains for a traffic management system configured to control AGVs in a logistics facility.

BRIEF DESCRIPTION OF THE INVENTION

In one embodiment, a traffic management system for controlling an automatic guided vehicle (AGV) is provided. The traffic management system includes a sensor arranged proximate to an intersection between a first passage and a second passage in a logistics facility. The sensor transmits at least one sensing beam into the second passage to detect presence of a vehicle in the second passage. The sensor transmits sensor signals based on the presence of the vehicle in the second passage. The traffic management system includes a traffic controller receiving the sensor signals from the sensor. The traffic controller has a communication module configured to be communicatively coupled to the AGV. The communication module transmits a blocked signal to the AGV when the sensor signals indicate presence of the vehicle in the second passage. The blocked signal causes the AGV to stop at a stopping location in the first passage and restrict movement of the AGV into the second passage. The communication module transmits a clear signal to the AGV when the sensor signals do not indicate presence of the vehicle in the second passage. The clear signal allows the AGV to move from the first passage into the second passage.

In another embodiment, a method of controlling movement of an automatic guided vehicle (AGV) from a first passage to a second passage in a logistics facility. The method navigates the AGV along the first passage to a stopping location proximate to an intersection between the first passage and the second passage and scans the second passage using at least one sensing beam of a sensor arranged proximate to the intersection to detect presence of a vehicle in the second passage. The method transmits sensor signals from the sensor to a traffic controller based on the presence of the vehicle in the second passage. The method transmits a blocked signal from the traffic controller to the AGV when the sensor signals indicate presence of the vehicle in the second passage. The blocked signal causes the AGV to remain at the stopping location in the first passage and restrict movement of the AGV into the second passage. The method transmits a clear signal from the traffic controller to the AGV when the sensor signals do not indicate presence of the vehicle in the second passage. The clear signal allows the AGV to move from the stopping location in the first passage to the second passage.

DETAILED DESCRIPTION OF THE INVENTION

Figure 1:
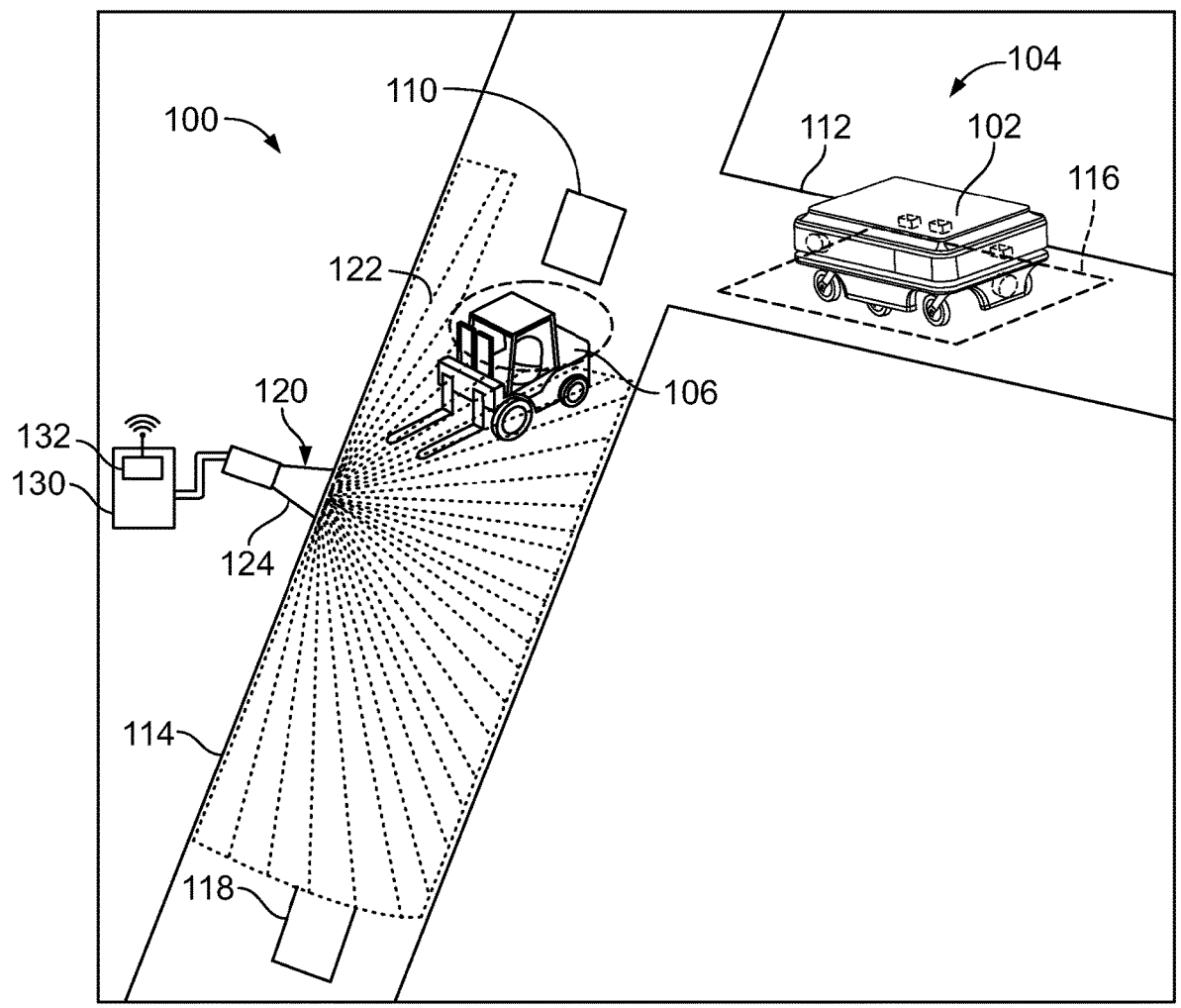
FIG. 1 illustrates a traffic management system in accordance with an exemplary embodiment.

FIG. 1 illustrates a traffic management system 100 in accordance with an exemplary embodiment. The traffic management system 100 is used to control movement of automated guided vehicles (AGVs) 102 within a logistics facility 104. The traffic management system 100 controls the AGVs 102 to prevent traffic congestion or traffic jams within the logistics facility 104. In an exemplary embodiment, the traffic management system 100 prevents the AGVs 102 from navigating to an area of the logistics facility 104 having other vehicles 106. For example, the traffic management system 100 prevents the AGVs 102 from navigating to an area of the logistics facility 104 until the other vehicles 106 clear the area. The vehicle(s) 106 may be manned vehicles or unmanned vehicles. In various embodiments, the vehicle 106 may be a forklift, a tugger, a parts cart, another AGV, or another vehicle. The vehicle 106 may be automatically controlled, such as by the traffic management system or another vehicle control system of the logistics facility. Alternatively, the vehicle 106 may be manually operated, either on the vehicle itself or from a remote control location. The traffic management system 100 provides automated control of the AGVs 102 based on operation and/or location of the vehicle 106 for efficient traffic management without operator involvement.

In an exemplary embodiment, the traffic management system 100 provides traffic management for the AGVs 102 between aisles or passages in the logistics facility 104. For example, the traffic management system 100 provides traffic management for the AGVs 102 at an intersection 110 between a first passage 112 and a second passage 114. The traffic management system 100 controls movement of the AGVs 102 from the first passage 112 into the second passage 114. In an exemplary embodiment, the traffic management system 100 restrict movement of the AGVs 102 into the second passage 114 when another vehicle 106 is located in the second passage 114. As such, the traffic management system 100 allows the vehicle 106 to clear out of the second passage 114 prior to allowing the AGVs 102 to turn into the second passage 114 from the first passage 112.

The traffic management system 100 includes a sensor 120 arranged proximate to the intersection 110 between the first passage 112 and the second passage 114. The sensor 120 is used to detect the presence of the vehicle 106 in the second passage 114. In an exemplary embodiment, the sensor 120 scans the second passage 114 for the vehicle 106. For example, the sensor 120 transmits at least one sensing beam 122 into the second passage 114 to detect presence of the vehicle 106 in the second passage 114. The sensor 120 may have a field of view that encompasses particular areas of the second passage 114 or the entire second passage 114. For example, the sensor 120 may have a 180° field of view. However, the sensor 120 may have a wider or narrower field of view in alternative embodiments. When the sensor 120 detects that the vehicle 106 is present, the traffic management system 100 restricts transition of the AGV 102 from the first passage 112 into the second passage 114. When the sensor 120 detects that the second passage 114 is clear (absence of the vehicle 106 in the second passage 114), the traffic management system 100 allows the AGV 102 to transition from the first passage 112 into the second passage 114. The sensor 120 may transmit a clear signal when no vehicle 106 is detected or the sensor 120 may transmit no signal at all when no vehicle 106 is detected, which corresponds to vehicle absence. For example, the sensor may only transmit a signal when the vehicle 106 is present, and thus the traffic management system 100 operates as if no vehicle is present when no signal is detected.

The traffic management system 100 includes a traffic controller 130 used to control movements of the AGVs 102 in the logistics facility 104. The traffic controller 130 receives sensor signals from the sensor 120. For example, the traffic controller 130 may be hardwired to the sensor 120. Alternatively, the traffic controller 130 may communicate wirelessly with the sensor 120. In an exemplary embodiment, the traffic controller 130 receives the sensor signals and analyzes the sensor signals to determine presence or absence of the vehicle 106 in the second passage 114. For example, the traffic controller 130 includes one or more processors for determining presence or absence of the vehicle 106 in the second passage 114 based on sensor signals from the sensor 120. Alternatively, the sensor 120 itself may include one or more processors for determining presence or absence of the vehicle 106 in the second passage 114 based on the scan of the second passage 114 by the sensor 120. In such embodiments, the data sent from the sensor to the traffic controller 130 is processed data rather than raw data.

In an exemplary embodiment, the traffic controller 130 includes a communication module 132 communicatively coupled to the AGV 102. The communication module 132 communicates wirelessly with the AGV 102. For example, the communication module 132 may communicate via Wi-Fi or other communication protocol. The communication module 132 may communicate wirelessly with the sensor 120. In an exemplary embodiment, the traffic management system 100 controls the AGV 102 via signals transmitted by the communication module 132. For example, the traffic management system 100 may allow or restrict movement of the AGV 102 from the first passage 112 to the second passage 114 via signals transmitted by the communication module 132. In various embodiments, the traffic controller 130 may instruct the AGV 102 to travel to a stopping location 116 in the facility. The designated stopping location 116 is a safe area for stopping because the AGV 102 does not block the second passage 114 when at the stopping location 116. In other various embodiments, rather than sending a "go to stopping location" signal to the AGV 102, the AGV may be programmed to automatically stop at the stopping location 116 when the AGV 102 approaches the stopping location 116. The traffic controller 130 may determine if it is safe to continue or travel from the stopping location 116.

In an exemplary embodiment, the communication module 132 transmits a blocked signal to the AGV 102 when the sensor signals indicate presence of the vehicle 106 in the second passage 114. The blocked signal causes the AGV 102 to stop at a stopping location 116 or restricts the AGV 102 from moving from the stopping location 116 into the second passage 114. In an exemplary embodiment, the communication module 132 transmits a clear signal to the AGV 102 when the sensor signals do not indicate presence of the vehicle 106 in the second passage 114. The clear signal allows the AGV 102 to move from the first passage 112 into the second passage 114.

In an exemplary embodiment, the sensor 120 includes a lidar scanner 124 configured to emit and receive the sensing beams 122. The sensing beams 122 may be laser light beams. The lidar scanner 124 receives the sensing beams 122 when the sensing beams 122 are deflected off of the vehicle 106 to detect presence of the vehicle 106. Undeflected sensing beams 122 are not received by the lidar scanner 124. Thus, when the vehicle 106 is not present, the lidar scanner 124 does not receive any deflected beams. In various embodiments, differences in laser return times and/or wavelengths can be used to detect the presence or absence of the vehicle 106. In an exemplary embodiment, the signals from the sensor 120 may be used to determine a location of the vehicle 106 in the second passage 114 and/or to determine a heading (for example, direction of movement) of the vehicle 106 in the second passage 114. In an exemplary embodiment, the signals from the sensor 120 may be used to determine a size of the vehicle 106 in the second passage 114. For example, the size of the vehicle 106 may be determined based on the number of sensing beams 122 deflected by the vehicle 106. In various embodiments, the sensor 120 may detect other objects in addition to the vehicle 106, such as people walking along the second passage 114 or working in the second passage 114. The traffic management system 100 may differentiate other objects other than the vehicle 106 to control the AGV 102. For example, the traffic management system 100 may be configured to detect a person walking or standing in the second passage 114. The traffic management system 100 may detect other smaller objects. The traffic management system 100 may differentiate various objects based on sizes of the objects, such as by determining the number of sensing beams 122 that are blocked. In various embodiments, the traffic management system 100 may only restrict operation of the AGV 102 when the vehicle 106 is present, allowing normal operation of the AGV 102 when other objects (for example, people) are present.

Other types of sensors may be used in alternative embodiments. For example, the sensor 120 may be a communication sensor configured to communicate directly with the vehicles 106 to determine when the vehicles are present. The sensor 120 may be a proximity sensor configured to detect presence of the vehicles 106 when the vehicles 106 are within a predetermined distance of the sensor 120.

In an exemplary embodiment, the sensor 120 may continuously monitor the second passage 114 for the vehicles 106. For example, the sensing beams 122 may be continuously transmitted. Sensing data from the sensor 120 may be continuously transmitted to the traffic controller 130. Alternatively, the sensing data from the sensor 120 may be transmitted to the traffic controller 130 upon a triggering event, such as upon detection of the vehicle 106 in the second passage 114. In other various embodiments, the sensor 120 may periodically monitor the second passage 114 and/or may periodically transmit the sensing data to the traffic controller 130. In alternative embodiments, the sensor 120 may be activated upon other triggering events. For example, when the AGV 102 moves to the stopping location 116, a sensing trigger may be sent to the sensor 120 causing the sensor 120 to scan the second passage 114.

During operation, the traffic controller 130 is used to control the AGV 102 within the logistics facility 104. The traffic controller 130 stops the AGV 102 from entering the second passage 114 when the vehicle 106 is present in the second passage 114. The traffic controller 130 receives the sensor signals from the sensor 120 to determine when the second passage 114 is clear and when the second passage 114 is blocked. In an exemplary embodiment, the traffic controller 130 transmits operating signals to the AGV 102 either restricting movement or allowing movement of the AGV 102. For example, the traffic controller 130 transmits the blocked signal to the AGV 102 when the sensor signals indicate presence of the vehicle 106 in the second passage 114 and the traffic controller 130 transmits the clear signal to the AGV 102 when the vehicle is absent from the second passage 114. The blocked signal causes the AGV 102 to stop or remain stopped at the stopping location 116 before entering the intersection 110, which provides space in the second passage 114 for the vehicle to continue through the intersection 110 after the tasks are performed in the second passage 114 (for example, after products are picked up or dropped off from one or more locations within the second passage 114). When the AGV 102 receives the clear signal, the AGV 102 is able to navigate from the first passage 112 into the second passage 114 and continue to a destination 118.

Figure 2:
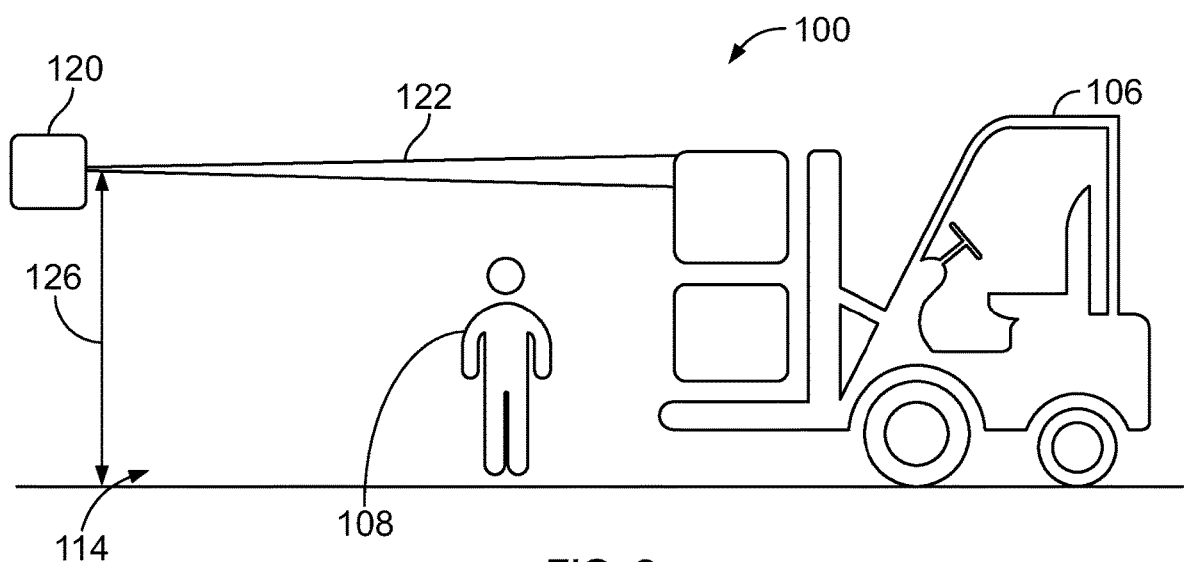
FIG. 2 is a side view of the traffic management system in accordance with an exemplary embodiment.

FIG. 2 is a side view of the traffic management system 100 in accordance with an exemplary embodiment. FIG. 2 illustrates the vehicle 106 and a person 108 in the second passage 114. In an exemplary embodiment, the sensor 120 is mounted at a height 126 above the ground above a typical height of a person. The sensor 120 emits the sensing beams 122 in a plane at the height 126. The sensing beams 122 are transmitted above the person 108. The person 108 does not interfere with the sensing beams 122. The sensing beams 122 are used to detect the presence of the vehicle 106 by scanning the vehicle 106 at the height 126. In various embodiments, the sensor 120 may be mounted at the height 126 above approximately 80 inches (2 meters). The height 126 may be selected based on the type of vehicle 106 being detected. For example, when the traffic management system 100 is used to detect forklifts, the height 126 is selected to be below the typical height of the forklift.

Figure 3:
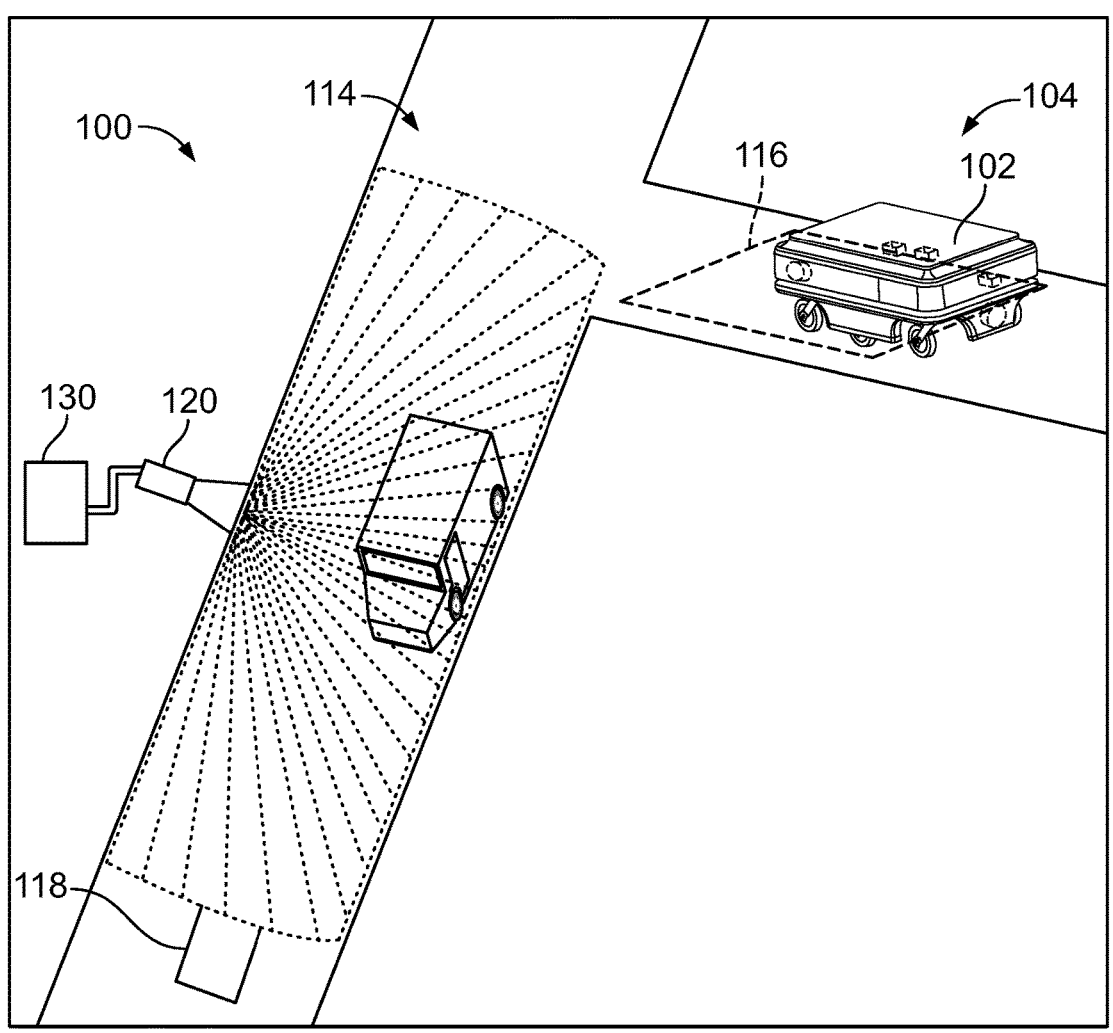
FIG. 3 illustrates the traffic management system and the logistics facility showing the second passage clear of any vehicles in accordance with an exemplary embodiment.

FIG. 3 illustrates the traffic management system 100 and the logistics facility 104 showing the second passage 114 clear of any vehicles 106 (shown in FIG. 1). FIG. 3 illustrates one of the AGVs 102 at the stopping location 116 and another AGV 102 within the second passage 114. In an exemplary embodiment, the AGVs 102 have a considerably smaller footprint than the vehicles 106. The AGVs 102 occupy a smaller area of the second passage 114 allowing the AGVs 102 to bypass each other if multiple AGVs 102 are in the second passage 114. Because the AGVs 102 are capable of bypassing each other within the second passage 114, the traffic management system 100 allows the AGV 102 to continue from the stopping location 116 into the second passage 114 if other AGVs 102 or people are in the second passage 114. The sensor 120 either does not detect the presence of the AGV 102 in the second passage 114 (for example, the sensor 120 is located at a height above the height of the AGV) or the sensor 120 detects the presence of the AGV 102 and identifies the object as the AGV 102 as opposed to being the larger vehicle 106. In such case, the traffic controller 130 sends a clear signal to the AGV 102 at the stopping location 116 allowing the AGV 102 to continue to the destination 118 from the stopping location 116.

With reference to FIGS. 1-3, the traffic management system 100 controls operation of the AGVs 102 within the logistics facility 104. The AGVs 102 are configured to autonomously navigate from the first passage 112 to the destination 118 in the second passage 114 based on input from the traffic controller 130 of the traffic management system 100. In an exemplary embodiment, the first passage 112 is a secondary passage within the logistics facility 104 and the vehicles 106 do not travel along such secondary passages. Rather, the vehicle 106 only travels along the first passage 112. The stopping location 116 provides an area for the AGV 102 to stop without interfering movement of the vehicle 106 in the first passage 112. The AGV 102 may worry or trigger a navigation request to the traffic controller 130 when the AGV 102 approaches or arrives at the stopping location 116. The vehicle 106 may be parked at a location along the second passage 114 for performing routine work, such as loading or unloading and may spend some time at such location before moving along the first passage 112 to a different location, such as a location beyond the intersection 110. To avoid having the AGV 102 travel along the first passage 112 to the location of the vehicle 106 to a deadlock situation (results from a navigation error for the AGV 102 when the path of the AGV is blocked, which causes the AGV 102 to stop at the location of the vehicle 106 and prevent the vehicle 106 from being free to move down the first passage 112), the AGV 102 is forced to stop the stopping location 116 until the traffic controller 130 sends a clear signal to the AGV 102.

The traffic management system 100 includes the sensor 120 and the traffic controller 130 and processes the data received from the sensor 120 to make a decision about whether or not the path to the destination 118 for the AGV 102 is clear or obstructed by the vehicle 106. The traffic controller 130 processes the sensor signals from the sensor 120 to determine whether or not the sensing beams 122 are blocked by any vehicle 106. In an exemplary embodiment, if the beams are blocked, the traffic controller 130 may determine the size of the object blocking the beams based on how many of the beams have been blocked. As such, the traffic controller 130 is able to determine if the object blocking the beams is a vehicle 106 or another object (for example, smaller objects block fewer beams). If the object blocking the beams is smaller than the vehicle 106, the traffic controller 130 may allow the AGV 102 to continue from the stopping location 116 into the first passage 112 for navigation to the destination 118. However, if the object blocking the beams is large enough to be the vehicle 106, the traffic controller 130 causes the AGV 102 to remain stopped at the stopping location 116. In various embodiments, the traffic controller 130 may recognize multiple vehicles 106 in the field of view.

Figure 4:
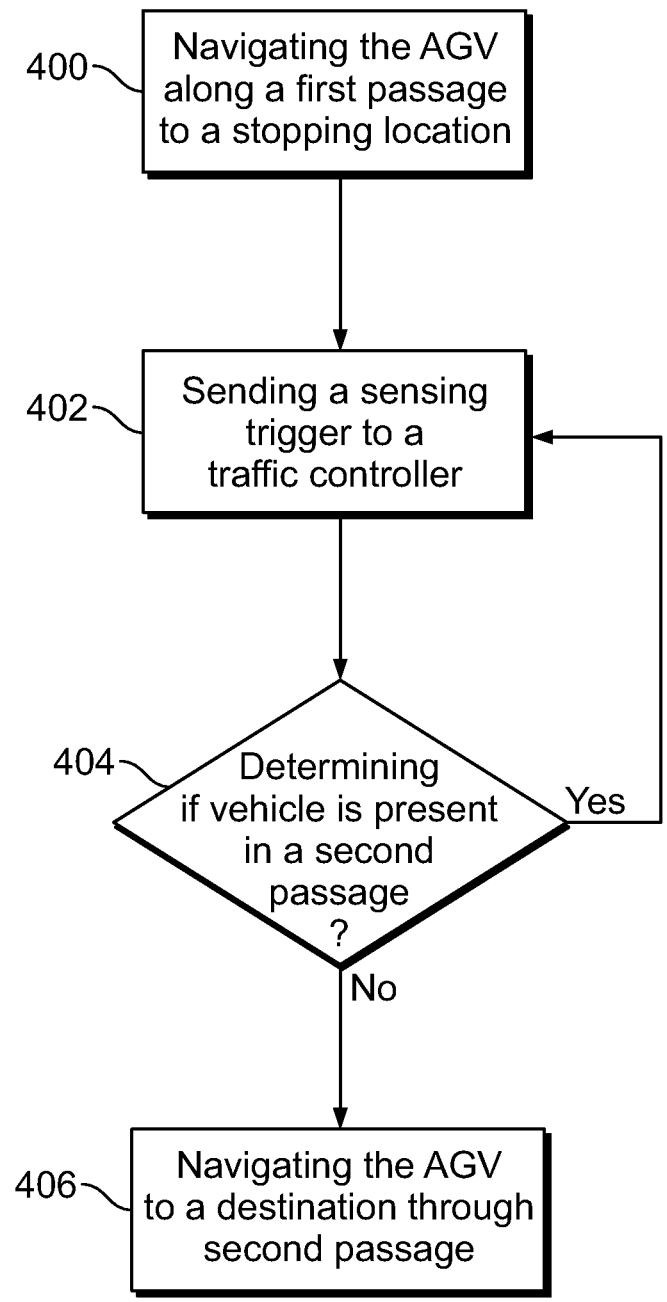
FIG. 4 is a flowchart illustrating a method of controlling movement of an AGV within a logistics facility in accordance with an exemplary embodiment.

FIG. 4 is a flowchart illustrating a method of controlling movement of an AGV within a logistics facility in accordance with an exemplary embodiment. The method controls the movement of the AGV from a first passage to a second passage within the logistics facility to avoid a deadlock situation between the AGV and another vehicle in the first passage.

At 400, the method includes navigating the AGV along the first passage to a stopping location proximate to an intersection between the first passage and second passage. The AGV stops at the stopping location and is unable to proceed into the second passage through the intersection until the traffic management system sends a clear signal to the AGV indicating that the second passage is clear of other vehicles. The stopping location represents a safe area for the AGV to stop and wait for the other vehicles to clear the second passage. The system controller may cause the AGV to travel to the AGV, such as by sending a "travel to" signal to the AGV causing the AGV to travel to the stopping location. Alternatively, the AGV may navigate through the facility and is caused to stop at the stopping location when the AGV approaches the stopping location. For example, when the AGV arrives at the stopping location, the AGV is caused to stop moving beyond the stopping location. At 402, the method includes sending a sensing trigger to the traffic controller 130. The sensing trigger may be automatically sent to the traffic controller of the traffic management system when the AGV is at the stopping location. The sensing trigger may be sent based on a GPS signal of the AGV indicating the location of the AGV at the stopping location. The sensing trigger may be sent based on a sensing device at the stopping location sensing the presence of the AGV at the stopping location 116.

At 404, the method includes determining if the vehicle is present in the second passage. The traffic management system determines if the vehicle is present in the second passage using the sensor. For example, the method may include scanning the second passage using sensor beams of the sensor to detect presence of the vehicle in the second passage. The scanning beams may be transmitted in multiple directions (for example, up and down the second passage 114). The method may include transmitting the sensor signals from the sensor to the traffic controller based on the presence of the vehicle and the second passage. Optionally, the sensor signals may be transmitted only when the vehicle is detected. When no vehicle is detected, no sensor signals may be transmitted. Alternatively, vehicle present sensor signals may be transmitted when the vehicle is present and vehicle absent sensor signals may be transmitted when no vehicle is detected. In various embodiments, the method may include transmitting a blocked signal from the traffic controller to the AGV when the sensor signals indicate presence of the vehicle in the second passage. The blocked signal may cause the AGV to remain at the stopping location in the first passage to restrict movement of the AGV into the second passage. The method may include transmitting a clear signal from the traffic controller to the AGV when the sensor signals to not indicate presence of the vehicle in the second passage. The clear signal may allow the AGV to move from the stopping location into the second passage to allow the AGV to continue to its destination.

In an exemplary embodiment, if it is determined that the vehicle is present in the second passage, the method returns to step 402 and another sensing trigger is sent to the traffic controller, which causes the traffic controller to begin determine if the vehicle is present in the second passage. Optionally, the sensor signal may be transmitted periodically, such as every few seconds. If it is determined that no vehicle is present in the second passage, the method continues. At 406, the method includes navigating the AGV to the destination through the second passage. For example, when the traffic controller transmits the clear signal to the AGV, the AGV is operated and moved from the stopping location through the intersection to the destination. The AGV moves autonomously through the second passage only after it is determined that no vehicles are present in the second passage. As such, deadlock situations are avoided.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A traffic management system for controlling an automatic guided vehicle (AGV) comprising:
a sensor arranged proximate to an intersection between a first passage and a second passage in a logistics facility, the sensor transmitting at least one sensing beam to detect presence of a vehicle, the sensor transmitting the at least one sensing beam into only the second passage to detect presence of the vehicle only in the second passage, the sensor transmitting sensor signals based on the presence of the vehicle in the second passage, wherein the traffic management system does not include the sensor monitoring vehicle presence in the first passage;
a traffic controller receiving the sensor signals from the sensor to control the AGV, wherein the traffic controller controls the AGV based on the vehicle presence monitoring of only the second passage and not the first passage, the traffic controller having a communication module configured to be communicatively coupled to the AGV, the communication module transmitting a blocked signal to the AGV when the sensor signals indicate presence of the vehicle in the second passage, the blocked signal causing the AGV to stop at a stopping location in the first passage and restrict movement of the AGV into the second passage, the communication module transmitting a clear signal to the AGV when the sensor signals do not indicate presence of the vehicle in the second passage, the clear signal allowing the AGV to move from the first passage into the second passage.

2. The traffic management system of claim 1, wherein the sensor is a lidar sensor configured to receive the at least one sensing beam when deflected off of the vehicle to detect presence of the vehicle.

3. The traffic management system of claim 1, wherein the traffic controller determines a location of the vehicle in the second passage based on the sensor signals.

4. The traffic management system of claim 1, wherein the traffic controller determines a heading of the vehicle in the second passage based on the sensor signals.

5. The traffic management system of claim 1, wherein the traffic controller is configured to restrict movement of the AGV from the stopping location until the clear signal is transmitted to the AGV.

6. The traffic management system of claim 1, wherein the sensor transmits presence signals when the vehicle is present in the second passage and the sensor transmits absence signals when the vehicle is absent from the second passage.

7. The traffic management system of claim 1, wherein the sensor scans the second passage when the AGV arrives at the stopping location and sends a triggering signal to the traffic controller to detect presence of the vehicle in the second passage.

8. The traffic management system of claim 1, wherein the traffic controller determines a size of the vehicle in the second passage based on the number of sensing beams deflected by the vehicle.

9. The traffic management system of claim 1, wherein the sensor is positioned to scan the second passage at a height above 80".

10. The traffic management system of claim 1, wherein the sensor does not transmit a sensing beam into the first passage.

11. A method of controlling movement of an automatic guided vehicle (AGV) from a first passage to a second passage in a logistics facility, the method comprising:
navigating the AGV along the first passage to a stopping location proximate to an intersection between the first passage and the second passage;
scanning the second passage using at least one sensing beam of a sensor of a traffic management system, the sensor arranged proximate to the intersection to detect presence of a vehicle in the second passage, wherein the traffic management system only monitors vehicle presence in the second passage and does not monitor the vehicle presence in the first passage;
transmitting sensor signals from the sensor to a traffic controller based on the presence of the vehicle in the second passage to control the AGV, wherein the traffic controller controls the AGV based on the vehicle presence monitoring of only the second passage and not the first passage;
transmitting a blocked signal from the traffic controller to the AGV when the sensor signals indicate presence of the vehicle in the second passage, the blocked signal causing the AGV to remain at the stopping location in the first passage and restrict movement of the AGV into the second passage; and
transmitting a clear signal from the traffic controller to the AGV when the sensor signals do not indicate presence of the vehicle in the second passage, the clear signal allowing the AGV to move from the stopping location in the first passage to the second passage.

12. The method of claim 11, wherein said scanning the second passage comprises scanning the second passage to determine a location of the vehicle.

13. The method of claim 11, wherein said scanning the second passage comprises scanning the second passage to determine a heading of the vehicle.

14. The method of claim 11, further comprising stopping the AGV at the stopping location until the clear signal is transmitted to the AGV.

15. The method of claim 11, wherein said transmitting the sensor signals comprises continuously transmitting the sensor signals.

16. The method of claim 11, wherein said transmitting the sensor signals comprises periodically transmitting the sensor signals.

17. The method of claim 11, further comprising triggering the sensor to scan the second passage when the AGV arrives at the stopping location.

18. The method of claim 11, further comprising transmitting the sensor signals from the sensor to the traffic controller based on the absence of the vehicle in the second passage.

19. The method of claim 11, further comprising determining a size of the vehicle in the second passage based on the number of sensing beams deflected by the vehicle.

20. The method of claim 11, wherein said scanning the second passage comprises scanning the second passage at a height above 80".

21. The method of claim 11, further comprising navigating the AGV into the second passage when the clear signal is transmitted to the AGV.

22. The method of claim 11, wherein the sensor does not scan the first passage.

* * * * *